July 30, 1957 T. D. MOIR ET AL 2,801,065

MATERIALS-HANDLING DEVICE

Original Filed May 17, 1952 4 Sheets-Sheet 1

Inventors:
James C. Skakel
Thomas D. Moir
By: Carl F. Peters
Attorney:

July 30, 1957 T. D. MOIR ET AL 2,801,065

MATERIALS-HANDLING DEVICE

Original Filed May 17, 1952 4 Sheets-Sheet 2

Inventors:
James C. Skakel
Thomas D. Moir
By: Carl F. Peters
Attorney.

Inventors:
James C. Skakel
Thomas D. Moir
By: Carl F. Peters
Attorney.

MATERIALS-HANDLING DEVICE

Original Filed May 17, 1952 4 Sheets-Sheet 4

Inventors:
James C. Skakel
Thomas D. Moir
By: Carl F. Peters
Attorney

United States Patent Office 2,801,065

Patented July 30, 1957

2,801,065

MATERIALS-HANDLING DEVICE

Thomas D. Moir, Los Angeles, Calif., and James C. Skakel, New York, N. Y., assignors to Great Lakes Carbon Corporation, New York, N. Y., a corporation of Delaware Continuation of application Serial No. 288,502, May 17, 1952. This application March 11, 1955, Serial No. 493,695

6 Claims. (Cl. 248—120)

This invention relates to portable devices adapted for use in lift truck operations and which may be generally classified as pallets, and to methods for handling bagged or otherwise packaged material by means of such devices. More particularly, this invention relates to a triangularly shaped hollow sleeve of substantially rigid construction designed to carry loads normally handled by pallets of conventional construction.

The practice of palletizing bags or cartons of commodities has met with considerable approval over the past fifteen years and received impetus during World War II. Pallets have heretofore consisted mainly of two horizontally disposed flat surfaces normally constructed of wooden planks or sheet steel separated by spacers of convenient length to permit fork handling by lift trucks. Wooden or steel pallets of conventional size normally weigh in excess of 100 lbs. Aside from the expense of the materials of construction for such devices, they occupy more than a justifiable proportion of the volume in a loaded box car or truck thereby reducing the net volume or weight of goods per shipment. Furthermore, the expense of shipping this type of pallet is considerable since it is shipped at the same rate as the commodity. A further disadvantage in these conventional platform pallets is the problem of returning the "empties." This has necessitated either a single shipment of the pallet followed by its destruction or adapting it to other uses on the part of the consignee unless returned to the shipper, which increases the cost of the original shipment.

Some attempts to overcome the above mentioned difficulties have been made in the form of pallets constructed of fiberboard or equivalent material. Numerous geometrical designs for these types of pallets have been devised in order to increase their resistance to crushing and their loading capacity. These types of pallets are characterized by one or two large, flat horizontal platforms, in common with the wooden or steel pallets described above, these being separated or supported by wooden or fiberboard spacers. While these innovations have resulted in decreasing the original cost of construction (i. e. materials and labor) and also in reducing the cost of shipment, these devices have not solved the problem of large loss of available shipping space in a box or truck.

It is a primary object of this invention to provide a palleting device which is light in weight so that its transportation cost will be negligible.

It is a further object of this invention to provide a pallet device of novel design which will require only a minimum of available car space in shipment.

It is a further object of the invention to provide a novel palleting device whose cost will be such that the devices can be discarded after one shipment but which is sufficiently strong rendering it usable in more than one shipment.

It is a further object of this invention to provide a palleting device which have adequate strengths to handle all but extremely heavy loads.

It is a further object of the invention to provide lightweight pallet devices made of fiberboard or other equivalent material which will have strengths adequate to handle average loads.

It is a further object of this invention to provide novel methods in the handling of the bagged or otherwise packaged material.

According to our invention we contemplate the construction of a hollow, and normally substantially rigid triangular body hereinafter referred to as a "sleeve" which is adapted to permit entry of the lifting fork of a fork truck materials-handling device.

Despite their low cost and lightweight construction the triangular sleeves of this invention have adequate size and dimensions to accommodate lift forks and still have adequate resistance to lateral collapse and sufficient strength and rigidity through the vertical or base side of the triangle to support loads normally placed on conventional wooden and steel pallets.

The essential features of our hollow, triangular sleeve palleting devices are as follows:

1. The sleeve must have one angle which is substantially a right angle.
2. The base side of the triangular sleeve must be shorter than the altitude side of the triangle.
3. The adjacent sides of the triangular sleeve must be secured to each other so as to prevent lateral collapse upon loading with bagged material.

A preferred material of construction for our sleeve pallet is corrugated fiberboard, preferably 350 lb. test, double faced C flute corrugated cardboard.

The invention will be further described in connection with accompanying drawings which illustrate the various features, modifications and embodiments of the invention.

The structures shown in Figures 1 to 5 comprise a materials-handling device constructed essentially from fiberboard sheet. In a preferred method of forming this embodiment of the invention, a corrugated fiberboard blank, or flat sheet, having a dimension of approximately 40" x 17" is properly folded several times to form a triangular sleeve which has a right angle and whose base or vertical side will have two courses or thicknesses of fiberboard. The blank is creased or scored perpendicular to the corrugated channels before folding in such a manner that the sides of the final shaped sleeve will be approximately: base or vertical side 1¾"; altitude or horizontal side 6"; and the hypotenuse or bag-engaging side 7".

It will be obvious that the above dimensions may be varied to suit the conditions such as the width and/or thickness of the fork of the lift truck, the length and width of the bags or cartons to be placed upon the sleeve, the load to be placed upon the sleeve, etc. Also the dimensions of the blank may be enlarged to provide a plurality of thicknesses or courses of fiberboard for the sides of the sleeve. The base or short vertical side of the triangle will have at least two courses of fiberboard to provide the optimum in rigidity and resistance to crushing and lateral collapse. The corrugation channels will extend laterally in the hypotenuse and altitude sides and vertically in the base or short side of the triangle.

Figures 1, 2, 3, 4:
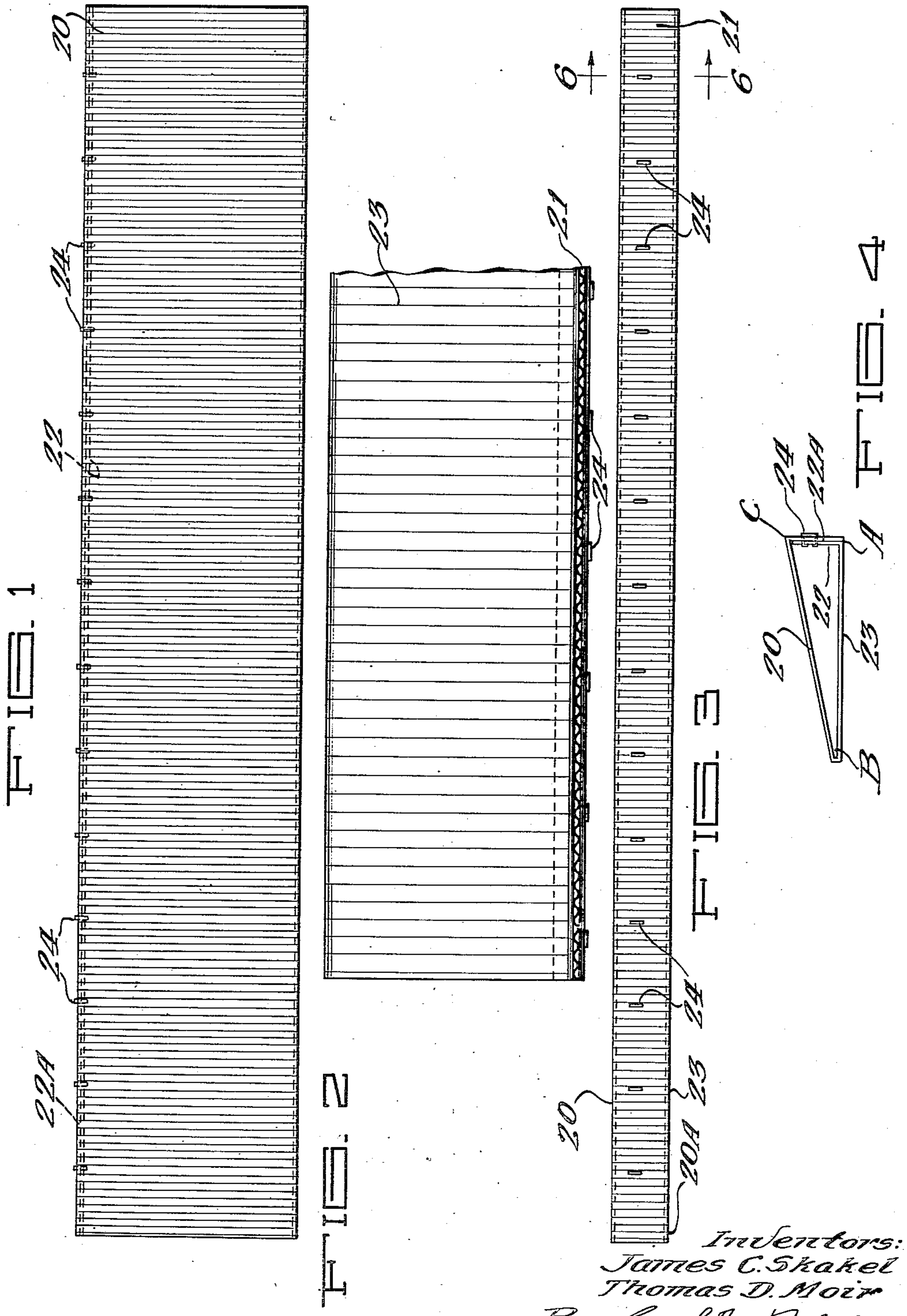
Figure 1 is a plan view of a preferred form of the novel sleeve pallet in accordance with our invention.
Figure 2 is an enlarged plan view of the bottom or altitude side of our novel triangular sleeve pallet.
Figure 3 is a rear view of the sleeve pallet of Figures 1 and 2.
Figure 4 is an end view of our novel sleeve pallet taken along the line 6—6 of Figure 3.

The triangular sleeve will therefore consist of a short vertical or base side 21, hypotenuse side 20, and an altitude or horizontal side 23. The angle between the base and altitude sides must be substantially a right angle A; angle B (herein referred to as the acute angle of the triangular sleeve) will be the angle formed by the altitude and hypotenuse sides of the sleeve; and angle C is formed by the base or vertical side and the hypotenuse side of the sleeve. Figures 2 and 3 are shaded to show the direction of the corrugated channels.

Figures 3 to 6 illustrate one method for securing the adjacent sides of our novel triangular sleeve to each other along or near the longitudinal ends 20A or trailing edges 21A to prevent lateral collapse of the sleeve upon loading. This consists of a series of staples 24 which fasten together the two courses or thicknesses 22 and 22A of fiberboard which form the base or short vertical side of the sleeve.

Figures 5, 6, 7, 8:
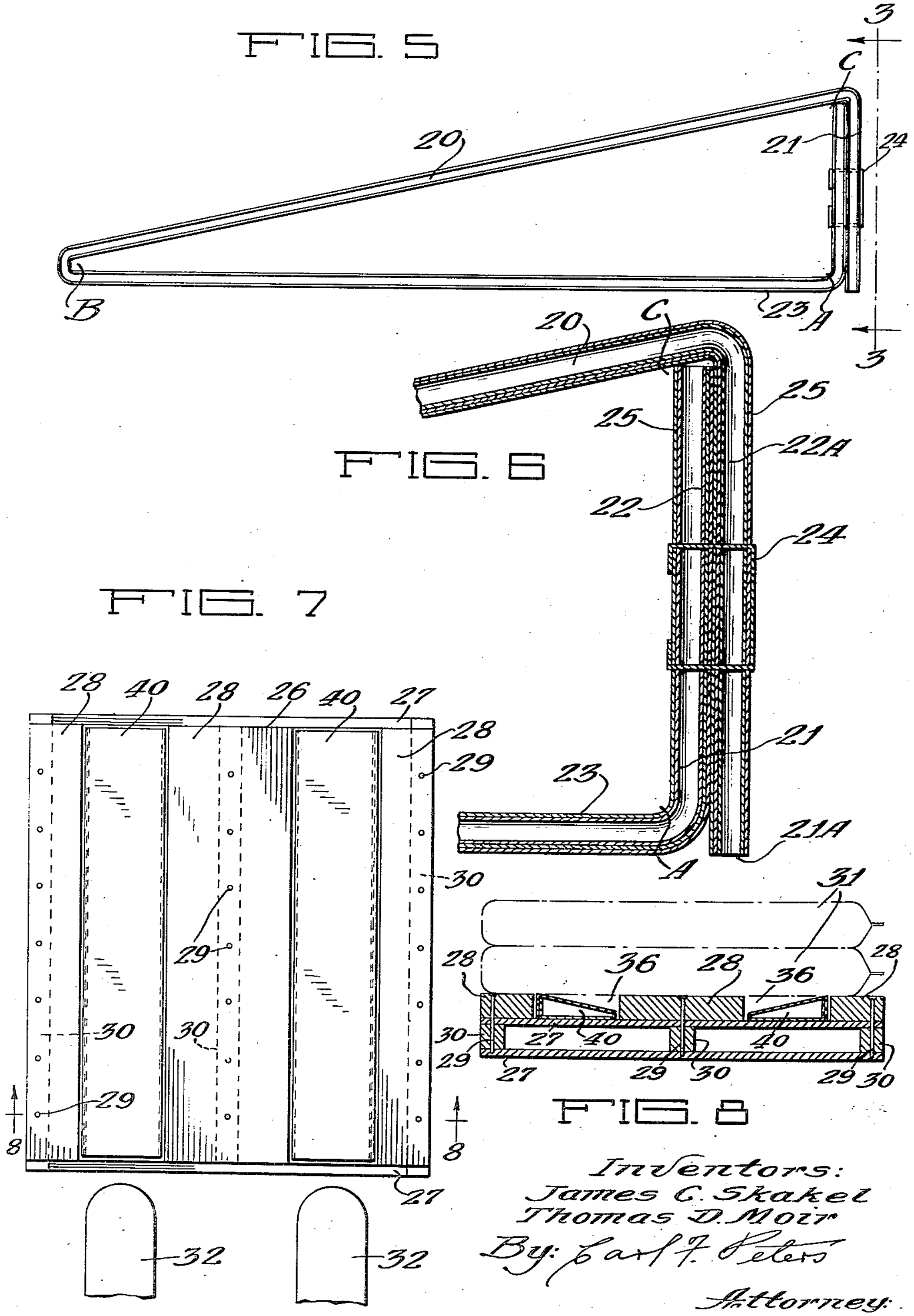
Figure 5 is an enlarged view of Figure 4.
Figure 6 is an enlarged, more detailed view, in cross section, of the base or vertical side of our triangular sleeve pallet taken along the line 3—3 of Figure 5.
Figure 7 is a plan view of a composite assembly useful in practicing our novel method of palletizing bagged material.
Figure 8 is an end view, partly in cross section, taken along the line 8—8 of Figure 7.
Figure 9:
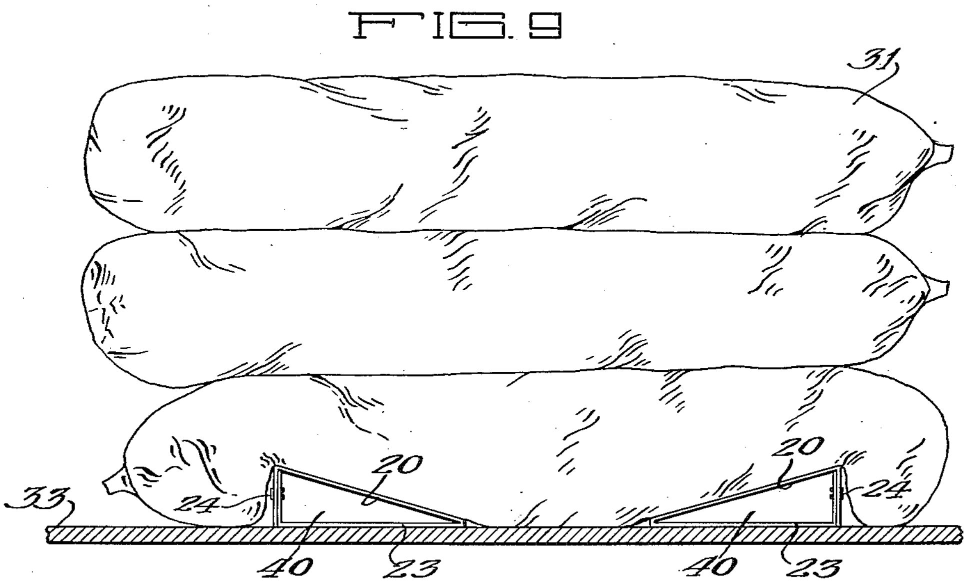
Figure 9 is an end view, partly in cross section, illustrating a stack of bagged material palletized by means of our novel sleeve palletizing device.

Figure 5 is an enlarged view of Figure 4 and illustrates the above essential features, namely, the altitude or horizontal side 23; the base or short vertical side 21 which must be shorter than the altitude side 23; the right angle A formed by sides 21 and 23; and the securing means to fasten together the adjacent sides of the sleeves, this being a stapling device 24.

Figure 6 is an enlarged view, in cross section, showing the construction of the base or short vertical side 21 of the embodiment in Figure 5 along the line 3—3 thereof. There is shown the double faced corrugated construction 25, the stapling means 24 securing the longitudinal ends 20A (22 and 22A) the horizontal or altitude side of the sleeve 23 and the base or vertical side 21 which consists of an inside course 22 and an outside course 22A of fiberboard. The figure further illustrates a preferred but not an absolutely essential feature of our invention which is achieved by bending a blank of fiberboard into the triangular shape herein described so as to provide a double course of fiberboard for the base or vertical side of the sleeve, this being done in a manner such that the trailing edge 21A of the outside course or thickness of the fiberboard on the base side 21 is substantially flush with the plane or outside face surface of the altitude or horizontal side of the sleeve. Shading between the double facing 25 indicates the direction of the interior corrugated channels.

Figures 10 through 14 are end views illustrating further embodiments of the invention. Again the material of construction is corrugated fiberboard, the securing means or staples 24 securing in Figure 10 the longitudinal ends 20A of the fiberboard blank which abut on the hypotenuse side of the sleeve; in Figure 11 on the hypotenuse and base or vertical side of the sleeve; in Figure 12 on the base, hypotenuse and altitude sides of the sleeve; in Figure 13 on the base and altitude sides of the sleeve; and in Figure 14 on the altitude side of the sleeve.

Figure 15:
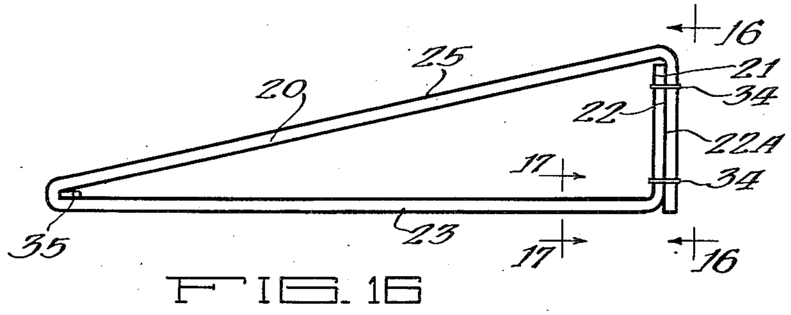
Figures 10 through 15 are diagrammatic end views of several embodiments of our invention.
Figure 16:
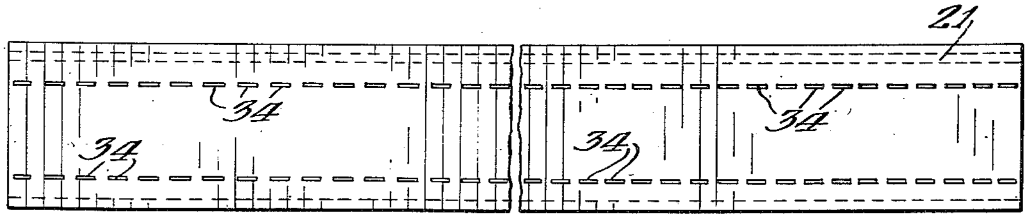
Figure 16 is a rear view of the embodiment of our invention along the line 16—16 of Figure 15.
Figure 17:
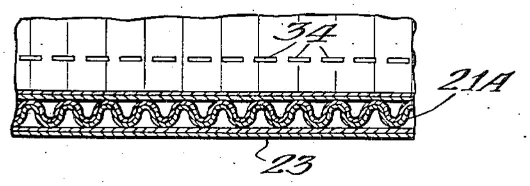
Figure 17 is an enlarged view, partly in cross section, of a portion of Figure 15 along the line 17—17 of Figure 15.
Figure 10:
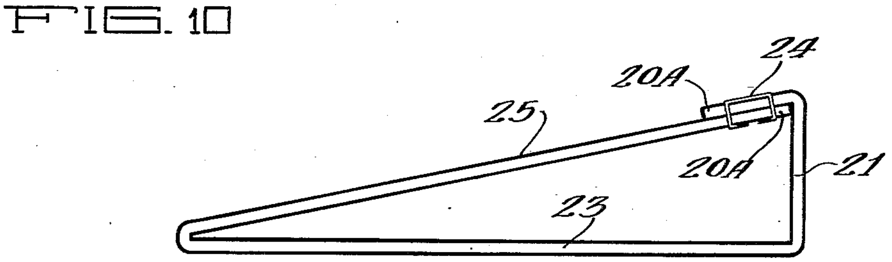
Figure 11:
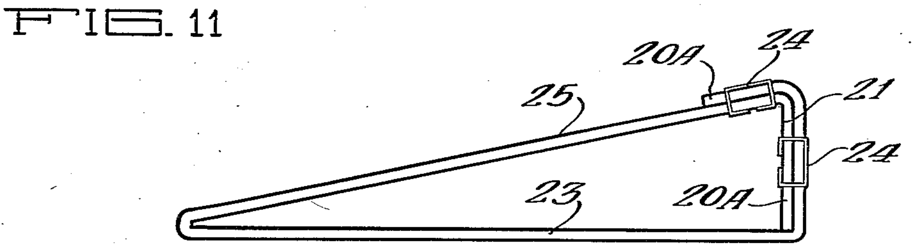
Figure 12:
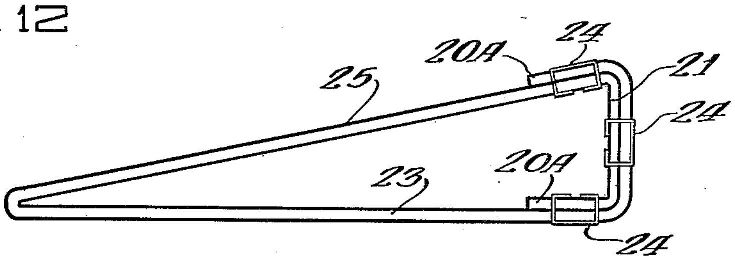
Figure 13:
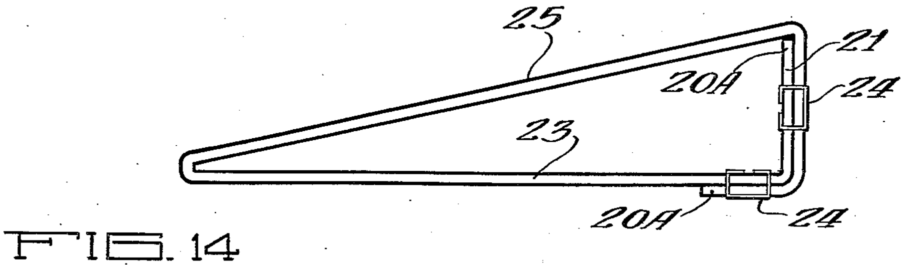
Figure 14:
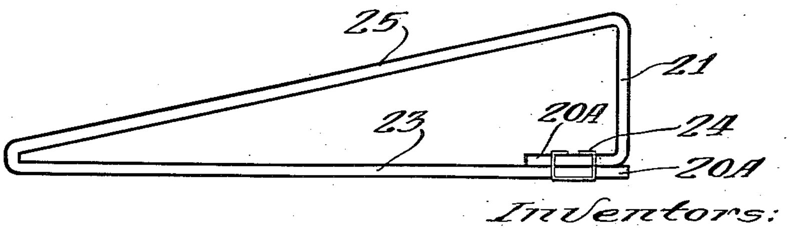

Figure 15 is an end view of a further embodiment of our invention showing the preferred construction including the altitude, base and hypotenuse sides 23, 21 and 20, respectively, with a double course or thickness of fiberboard forming the base or short vertical side 21. In this embodiment of the invention, the adjacent sides of the sleeves are secured by stitching 34, through both courses of fiberboard 22 and 22A which form the base side 21. The embodiment illustrated in Figure 15 further illustrates schematically a reinforcing member 35 positioned in the acute angle B of the triangular sleeve and secured therein as by gluing, which member may be either a roll or conforming shape of corrugated fiberboard, a cardboard tube or rectangle, or any of the foregoing of wooden construction, and which runs substantially along the longitudinal length of the sleeve giving support to this section in the event that unusually heavy loads are to be placed upon it. Figure 16 is an end view of the embodiment shown in Figure 15 along the line 16—16 thereof showing the base or short vertical side 21 of the triangle and the stitched securing means 34. Figure 17, taken along the line 17—17 of Figure 16, shows the corrugated construction of the trailing edge 21A of the outside course 22A in cross section and the stitched base side 21 in perspective.

Our invention further contemplates the embodiment of means other than stapling or stitching to secure the longitudinal ends 20A of the fiberboard blanks, including the two or more courses of fiberboard forming the base side 21 of the triangular sleeve. For example, we may employ adhesive as a securing means. When construction materials more rigid than corrugated fiberboard are employed the ends of the blanks need not be overlapped.

As previously mentioned herein the dimensional details or ratio thereof of the sides of the triangular sleeve are somewhat flexible providing, of course, that the base or vertical side 21 remain shorter than the altitude or horizontal side 23 of the sleeve. We have found that the base or vertical side of the sleeve should be between 1½" to about 2½", such a construction being adaptable to most fork trucks and providing at the same time maximum resistance to lateral collapse and maximum crushing strength. The length of the sleeves will depend upon the dimensions of the bagged material to be loaded thereon. Preferably, the length will be such that the sleeves will not protrude beyond the overlying bags or containers in order to avoid any possible damage to the bags caused by jostling during transit.

Figures 7 and 8 illustrate a preferred method of carrying out our novel palleting operation. Figure 7 is a plan view of an arrangement including a template platform designated generally as 26 having guide members or cleats 28 in which are placed our novel triangular sleeve pallet device shown generally as 40. Figure 8 is a cross sectional view of Figure 7 along the line 8—8 thereof showing a stage or platform consisting of wooden plank members 27 separated by wooden spacers 30 and having superimposed upon the upper surface wooden guide members or cleats 28 which run the length of the platform defining slots or guiding grooves 36 whose width and height are slightly greater than base and altitude sides of the triangular sleeve pallets. The guide members 28 are secured to the platform by means of bolts or screws 29. The template platform is placed beneath or adjacent to the bagging device. As the bags are loaded and sealed (as by stitching, gluing or tying) they are placed lengthwise transversely across the sleeve pallets which are positioned in the grooves 36 with sufficient overlap of the sleeves by the ends of the bags so as to prevent the bags from falling through the intervening space between the sleeves when they are lifted from the grooves 36 by means of the forks 32 of a lift truck. It will be noted that the grooves of the template platform are positioned to permit the aforementioned overlapping of these grooves by the bags. The distance between the sleeve pallets, which are arranged with their acute angles oppositely and in parallel disposed, can be readily determined by a reasonably skilled operator.

Figure 8 illustrates a stack of bagged material 31 which has been fork truck-lifted by means of our novel sleeve pallets from the grooves 36 of the template platform 26 and placed upon the floor 33 of a warehouse or box car. It may be said that in subsequent lifting operations the floor actually becomes a part of the overall pallet which includes the triangular sleeve members 40. The surface of the bottom bag of the stack rests against the floor area between the sleeves and on the horizontal side therefore.

We have found that sleeves constructed of 350 lb. test corrugated double-faced fiberboard in a manner illustrated in Figures 5 and 6 can support a load of 1000 lbs. and that when several stacks of bagged material are properly placed in a box car so as to prevent substantial shifting in transit, it is possible to unload the palletized load at its destination by means of a lift truck.

When the sleeve pallets of this invention are to be exposed to adverse conditions, it is sometimes advisable to treat the fiberboard or other cellulosic blanks or sleeves with certain chemicals or solutions which will render them water-proof, water repellent or resistant to rotting. Our invention therefore contemplates the impregnation of the fiberboard with water repellent materials including oily or resinous solutions and synthetic and inorganic silicates such as water glass, solution of asphaltic or other bituminous materials, etc. or insolubilized glues. It is also in the scope of our invention to place paper sheeting or other webbing material such as canvas, burlap, etc. across or between the novel sleeve pallets to avoid having to place the bags or cartons to be palletized directly upon the floor or loading platform. This embodiment is not illustrated in the attached drawings but the web can be either merely laid between the sleeves and across them; alternatively the webbing may be laid across the sleeves and looped about them thereby resulting in an inside-reinforced loop which is adapted to receive the forks of a lift truck. This is an obvious expedient and does not form an essential feature of the present invention. This feature subtracts very little from the available space in a box car or truck in which the palletized bags or cartons will be placed.

This application is a continuation of our co-pending application, Serial No. 288,502 filed May 17, 1952 for "Materials-Handling Device," now abandoned.

Having thus exemplified our invention, but without necessarily being limited to the specific embodiments herein disclosed, what we desire to secure by Letters Patent is:

1. A portable fiberboard materials-handling device adapted for use in lift truck palleting operations comprising a hollow, triangular sleeve wherein one angle is substantially a right angle, the base of said triangular sleeve being shorter than its altitude, said sleeve being constructed of corrugated fiberboard bent into the aforesaid shape, the corrugation channels runnings laterally in the hypotenuse and altitude sides and vertically in the base side of the triangle, and providing at least two mutually secured courses of fiberboard for the base side of the sleeve, said construction making the sleeve substantially rigid and resistant to lateral collapse under load.

2. A portable fiberboard materials-handling device adapted for use in lift truck palleting operations comprising a hollow, substantially rigid triangular sleeve wherein one angle is substantially a right angle, the base of said triangular sleeve being shorter than its altitude, said sleeve being constructed of corrugated fiberboard bent into the aforesaid shape so as to provide a double course of fiberboard for the base side of the sleeve, the corrugation channels running laterally in the hypotenuse and altitude sides of the sleeve, said double course comprising the base side of the sleeve being mutually secured, said construction making the sleeve substantially rigid and resistant to lateral collapse under load.

3. A device according to claim 1 wherein the courses of corrugated fiberboard which form the base side of the sleeve are secured by stapling.

4. A portable fiberboard materials-handling device adapted for use in lift truck palleting operations comprising a hollow, triangular sleeve wherein one angle is substantially a right angle, the base of said triangular sleeve being shorter than its altitude, said sleeve being constructed of corrugated fiberboard bent into the aforesaid shape, the corrugation channels running laterally in the hypotenuse and altitude sides and vertically in the base side of the triangle, and providing at least two mutually secured courses of fiberboard for the base side of the sleeve and a reinforcing member in the angle formed by the altitude and hypotenuse sides, said construction making the sleeve substantially rigid and resistant to lateral collapse under load.

5. A portable fiberboard materials-handling device adapted for use in lift truck palleting operations comprising a hollow, triangular sleeve wherein one angle is substantially a right angle, the base of said triangular sleeve being shorter than its altitude, said sleeve being constructed of corrugated fiberboard bent into the aforesaid shape, the corrugation channels running laterally in the hypotenuse and altitude sides and vertically in the base side of the triangle, and providing at least two mutually secured courses of fiberboard for the base side of the sleeve and a reinforcing member secured in the angle formed by the altitude and hypotenuse sides, said construction making the sleeve substantially rigid and resistant to lateral collapse under load.

6. A device according to claim 1 wherein the courses of corrugated fiberboard which form the base side of the sleeve are secured by adhesive.

References Cited in the file of this patent

UNITED STATES PATENTS

| | | |
|---|---|---|
| 2,420,393 | Dorsey | May 13, 1947 |
| 2,503,240 | Cahners | Apr. 11, 1950 |
| 2,506,346 | Crawford | May 2, 1950 |
| 2,507,757 | Bowman et al. | Oct. 9, 1951 |
| 2,609,136 | Sider | Sept. 2, 1952 |